June 20, 1933.   J. F. WHITE   1,914,470
AUTOMATIC FISHING REEL
Original Filed April 25, 1930
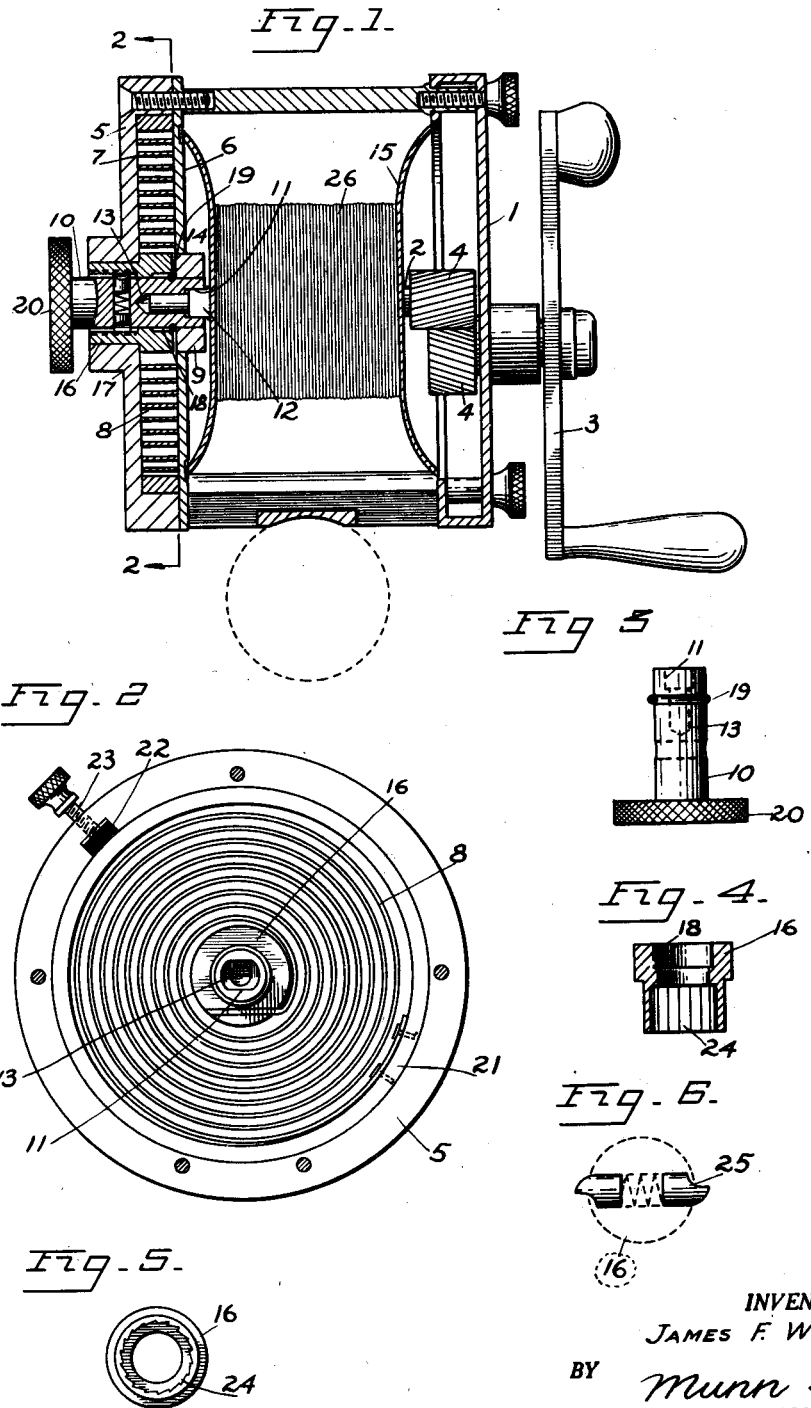
INVENTOR.
JAMES F. WHITE
BY Munn & Co.
ATTORNEYS.

Patented June 20, 1933

1,914,470

UNITED STATES PATENT OFFICE

JAMES F. WHITE, OF RICHMOND, CALIFORNIA, ASSIGNOR TO HENRY D. LANE, OF RICHMOND, CALIFORNIA

AUTOMATIC FISHING REEL

Application filed April 25, 1930, Serial No. 447,287. Renewed April 4, 1932.

My invention relates to improvements in automatic fishing reels, and it consists in the combinations, constructions and arrangements hereinafter described and claimed.

An object of my invention is to provide an automatic fishing reel which is extremely simple in construction and which makes use of an untensioned coil spring that may be directly connected to or disconnected from the spool at the will of the operator. When the spring is connected directly to the reel spool, the device is automatic in operation because the striking of a fish will automatically connect the fish directly to the spring by means of the fish line, and as soon as the fish starts to swim away, an increasing force is placed upon the line by the spring as the spring is tensioned, and this force is in direct ratio to the movement of the fish away from the device. The moment the fish relaxes in its efforts in trying to swim away, the spring will rotate the reel spool for pulling the fish toward the device.

A further object of my invention is to provide a device of the type described which makes use of novel means for adjusting the maximum amount of force the fish will exert on the line. One end of the spring is connected directly to the reel spool shaft, while the other end is connected to a slip ring, and a friction shoe may be applied to the slip ring at any desired force, and the greater the force applied on the slip ring the more the spring will be tensioned before the ring will start to rotate within the casing. If a small fish is being played, the tension may be slight. The opposite is true if a large fish has been caught.

One of the objects and advantages of the present invention lies in the fact that the spool can rotate of its own momentum after the spring has been completely relaxed, due to the construction of the reel. This has a decided advantage over former reels in bringing in the line or a fish and particularly salt-water game fish. By moving the rod up slowly and down quickly, or "pumping" as it is generally termed, the fish can be gotten in much easier than with the usual type of reel. Thus when the rod is elevated against the pull of the fish the spring will be placed under tension. When the rod is lowered quickly and the tension on the line is relaxed, the spring will immediately start the spool in rotation and the momentum of the spool will cause it to continue to rotate so that considerably more line is brought in on the downward movement of the rod than was paid out in its upward movement while the spring was placed under tension.

The reel spool may be disconnected from the spring and will then operate as a free spool or as an ordinary reel in which the spool is rotated from the crank. A ratchet mechanism is provided for preventing the winding of the spring in the wrong direction.

Other objects and advantages will appear as the specification proceeds, and the novel features of the device will be particularly pointed out in the claims hereto annexed.

My invention is illustrated in the accompanying drawing, in which:

Figure 1 is a longitudinal section through the device, portions being shown in elevation, Figure 2 is a section substantially along the line 2—2 of Figure 1, Figure 3 is a side elevation of a part of the device, Figure 4 is a transverse section through another part of the device, Figure 5 is an end view of Figure 4, and Figure 6 is a side view of another part of the device.

In carrying out my invention I provide a fishing reel having an end casing 1 (see Figure 1) for supporting a reel spool shaft 2 and a crank handle 3. The crank handle is shown connected to the shaft 2 by gearing 4. It is obvious that the gear 4 associated with the crank 3 may be movable toward and away from the gear 4 on the shaft 2, this structure being standard and therefore not shown.

An end casing 5 (see Figure 1) has a cover plate 6 forming a compartment 7 for receiving a coil spring 8. The cover 6 has a bearing 9, and this bearing slidably and rotatably receives a ratchet shaft 10.

The ratchet shaft 10 has a non-circular recess 11 for receiving a non-circular portion 12 of the reel spool shaft 2. A cylindrical bore 13 is provided in the shaft 10, and this is axially aligned with the non-circular recess 11. The shaft 2 has a reduced cylindrical end 14 that is rotatably received in the bore 13.

When the shaft 10 is in the position shown in Figure 1, the portions 11 and 12 directly connect the shaft to the shaft 2. A reel spool 15 is carried by the shaft.

A spring carrier 16 (see Figures 1, 4 and 5) is rotatably mounted in a boss 17 integral with the end casing 5. The spring carrier rotatably supports the shaft 10, and has an annular recess 18 for limiting the longitudinal movement of the shaft 10 with respect to the spring carrier 16. A wire 19 is shrunk on the shaft 10, and this wire has a limited movement in the annular recess 18. The shaft 10 may be moved to the left in Figure 1 by grasping a knurled knob 20 integral with the shaft for moving the knob to the left until the wire 19 engages with the shoulder at the opposite side of the recess 18. This prevents the shaft 10 from being entirely withdrawn. The movement of the shaft 10 to the left is sufficient to disconnect the shaft 10 from the shaft 2 so that the shaft 2 is free to rotate irrespective of the shaft 10 while still being supported by the portion 14.

The spring 8 (see Figure 2) has its inner end connected to the spring carrier 16 and its outer end connected to a slip ring 21, the latter being rotatably mounted in the casing 5. A friction shoe 22 is disposed in the casing 5, and an adjusting screw 23 may be rotated to bear against the shoe 22 for causing the latter to exert any desired force against the ring 21. In this manner the shoe may be adjusted so as to have the spring 8 exert a five pound pull, for example, before the slip ring 21 will rotate in the casing 5. It is obvious that this pull may be changed at the will of the fisherman.

In order to prevent the spring from being wound in the wrong direction, I provide ratchet teeth 24 in the spring carrier 16 (see Figures 1, 4 and 5), and these ratchet teeth are engaged by spring-pressed pawls 25 (see Figure 6) that permit the slipping of the pawls 25 over the ratchet teeth 24 during the winding up of the line 26 on the reel spool 15.

The curved rear surfaces of the pawls 25 which are carried with the spool permit the spool to overrun when the spool is rotated by the spring. This overrunning of the spool by its own momentum after the spring has completely unwound, enables the fisherman to bring in the line or fish by "pumping" the rod, the successive overrunnings of the spool gradually bringing in the line. Heretofore in "pumping" the fisherman has been required to reel the line in by operating the crank on the down stroke. The construction of the present reel automatically retrieves the line and the fisherman has only to "pump" the rod to bring in the fish.

From the foregoing description of the various parts of the device, the operation thereof may be readily understood.

In casting, the shaft 10 may be disconnected from the shaft 2 and the reel used in the ordinary manner. When it is desired to make the reel automatic in operation, the shaft 10 is moved longitudinally inwardly so as to operatively connect it with the shaft 2. The spring 8 is now directly connected to the reel 15. The spring is coiled as shown in Figure 2, but is not under tension.

As soon as the fish strikes and starts to pull the line 26 so as to unwind it from the reel 15, the spring 8 will be instantly tensioned because it will start to be wound up, and this tension will increase as the fish pulls away from the reel. The adjusting screw 23 has been previously set so that the ring 21 will slip within the casing 5 when a predetermined tension upon the string has been reached. As soon as the fish relaxes in its efforts in swimming away, the spring 8 will automatically come into play and will pull the fish toward the reel. Of course, the fisherman is watching, and should the spring 8 expend its force and resume its untensioned condition, the fisherman can actuate the crank 3 for continuing to wind in the line should occasion demand. This continued movement of the winding in of the line will not wind the spring 8 in the wrong direction because the ratchet mechanism will automatically disconnect the shaft 10 from the spring carrier 16 during this movement. It should be noted that the spring 8 is not connected to the shaft 2 through any gear mechanism, but is directly connected thereto when the shafts 10 and 2 are connected together as a unit.

Although I have shown and described one embodiment of my invention, it is to be understood that the same is susceptible of various changes, and I reserve the right to employ such changes as may come within the scope of the claims hereto annexed.

I claim:

1. An automatic fishing reel comprising a frame, a reel spool rotatably carried thereby and having fishing line wound thereon, a normally untensioned spring directly connected to the reel, said spring being tensioned in direct ratio to the amount of line unwound from the reel, manually controlled winding means for winding the line on the spool, and means for automatically disconnecting the spring from the spool during the winding of the line thereon and after the spring has become untensioned.

2. An automatic fishing reel comprising a frame, a reel spool rotatably carried thereby, a ring rotatably mounted in the frame, a spring directly connecting the ring and spool together, a friction shoe bearing on the ring, manually controlled means for varying the force exerted by the shoe on the ring, manually controlled winding means for winding line on the spool, and means for automatically disconnecting the spring from the spool during the winding of the line thereon and after the spring has become untensioned.

3. In a fishing reel of the character described, a spring carrier having a bore extending therethrough provided with ratchet teeth, a ratchet shaft rotatable and slidably arranged therein, spring-pressed pawls carried by the shaft and engaging with said teeth, and means for limiting the axial movement of the shaft with respect to the carrier for preventing the disengagement of the pawls from the teeth.

4. In a fishing reel of the character described, a spring carrier having a bore extending therethrough provided with ratchet teeth, a ratchet shaft rotatable and slidably arranged therein and fashioned with a bore extending diametrically through the shaft, pawls disposed in the aperture, and a common spring housed between the pawls and urging the latter into engagement with the ratchet teeth.

5. A fishing reel comprising a frame, a spool shaft within the frame, crank mechanism connected with the spool shaft whereby the spool may be manually rotated, a coil spring within the frame, means to connect or disconnect the coil spring and the spool shaft, and a ratchet to cause the spring to be placed under tension when the line is unwound from the spool but to permit rotation of the spool shaft by the crank.

6. A fishing reel comprising a frame, a spool shaft within the frame, crank mechanism connected with the spool shaft whereby the spool may be manually rotated at all times, a coil spring within the frame, a manually controlled clutch to connect or disconnect the coil spring and the spool shaft, and a ratchet associated with the clutch to connect the clutch and the spring for winding the spring when the spool is rotated by withdrawal of the line.

7. A fishing reel comprising a frame, a spool shaft within the frame, crank mechanism connected with the spool shaft whereby the spool may be manually rotated, a coil spring within the frame, means to connect or disconnect the coil spring and the spool shaft, a ratchet to cause the spring to be placed under tension when the line is unwound from the spool but to permit rotation of the spool shaft by the crank, and means for exerting a frictional drag upon the spring.

8. A fishing reel comprising a frame, a spool shaft within the frame, crank mechanism connected with the spool shaft whereby the spool may be manually rotated at all times, a coil spring within the frame, a manually-controlled clutch to connect or disconnect the coil spring and the spool shaft, a ratchet associated with the clutch to connect the clutch and the spring for winding the spring when the spool is rotated by withdrawal of the line, and means for exerting a frictional drag upon the spring.

9. In a fishing reel, a spool, a spring rotatable as a unit and connectible with the spool for acting as a brake, a ratchet connection between the spring and the spool, and frictional means for retarding the rotation of the spring when the latter is connected to the spool.

10. In a fishing reel, a casing, a spool carried thereby, a coiled spring rotatable as a unit, a ratchet connection between the spring and the spool, and frictional means to retard the rotation of the spring when the spool is rotated in one direction.

11. In a fishing reel, a spool shaft, a normally untensioned braking spring, a pawl and ratchet for connecting the spring to the shaft for applying braking force when the shaft is rotated in one direction, and manually-controlled means for causing the pawl and ratchet to connect the spring to the shaft or to disconnect them from the shaft and permit free rotation of the latter in either direction.

12. In a fishing reel, a spool shaft having a non-circular portion, a pawl and ratchet engageable with and disengageable from the non-circular portion, a braking spring connected to the pawl and ratchet, and a handle for moving the pawl and ratchet into either of their two positions.

13. An automatic fishing reel comprising a frame, a spool rotatably carried thereby, a coil spring in the frame, friction means operative on the outer end of the spring to retard the rotation thereof, a sleeve to which the inner end of the spring is connected, and a positive clutch accessible from the exterior of the reel and operative independently of the spool rotation to connect or disconnect the sleeve and the spool.

14. In a fishing reel, a casing, a spool and a spring rotatable as a unit in the casing, a ratchet to connect the spring and the spool when the spool is rotated by unwinding of the line, and friction means to hold the spring while the spool is so rotated, but to permit the rotation of the spring with the spool after a predetermined tension has been set up therein.

15. In a fishing reel, a casing, a spool and a spring rotatable as a unit in the casing, a ratchet to connect the spring and the spool when the spool is rotated by unwinding of the line, friction means to hold the spring while the spool is so rotated, but to permit the rotation of the spring with the spool after a predetermined tension has been set up therein, and means to disconnect the spool and the spring.

16. In a fishing reel, a casing, a spool within the casing, a spring also located in the casing and being capable of rotation as a unit therein, friction means to retard the rotation of the spring, and a ratchet connection between the spool and the spring.

17. In a fishing reel, a casing, a spool within the casing, a coil spring also located in the casing and being capable of rotation as a unit therein, friction means to retard the rotation of the spring but to permit its rotation after a predetermined tension has been built up therein, and a ratchet connection between the spool and the spring which will cause the spring to be wound as the line is withdrawn, but which will permit the spool to rotate of its own momentum after the spring is relaxed.

18. In a fishing reel, a casing, a spool within the casing, a spring located in the casing, and means to connect the spring and the spool so that as the line is withdrawn the spring will be placed under tension, said means including a ratchet which will permit the spool to rotate of its own momentum to reel in the line after the spring has been relaxed.

19. In a fishing reel, a casing, a spool within the casing, a spring acting in opposition to the withdrawal of the line, means to connect the spring and the spool, and means operable upon the spring to permit it to slip after a certain tension has been placed thereon and thus allow the spool to continue to rotate, said connecting means including a ratchet device to permit the spool to rotate of its own momentum to reel in the line after the spring has relaxed.

20. In a fishing reel, a spool, a spring rotatable as a unit and connectible with the spool for acting as a brake, a ratchet connection between the spring and the spool, and frictional means for retarding the rotation of the spring when the latter is connected to the spool, and at least after it has been placed under a predetermined tension.

21. In a fishing reel, a casing, a spool carried thereby, a coiled spring rotatable as a unit, a ratchet connection between the spring and the spool, and frictional means to retard the rotation of the spring when the spool is rotated in one direction, and at least after the spring has been placed under a predetermined tension.

JAMES F. WHITE.